(12) United States Patent
Gulve et al.

(10) Patent No.: US 7,509,535 B1
(45) Date of Patent: Mar. 24, 2009

(54) SYSTEM AND METHOD FOR MANAGING FAILOVER IN A DATA STORAGE ENVIRONMENT

(75) Inventors: Somnath A. Gulve, Morrisville, NC (US); Michael D. Haynes, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 473 days.

(21) Appl. No.: 11/238,475

(22) Filed: Sep. 29, 2005

(51) Int. Cl.
*G06F 11/00* (2006.01)

(52) U.S. Cl. .................. 714/43; 714/6; 714/18

(58) Field of Classification Search .................. 714/43, 714/13, 2, 6, 18
See application file for complete search history.

(56) References Cited

U.S. PATENT DOCUMENTS

| | | | | |
|---|---|---|---|---|
| 6,631,479 B1* | 10/2003 | Nishimura | .................... | 714/18 |
| 7,032,040 B2* | 4/2006 | Hosoya | ........................ | 710/19 |
| 7,039,827 B2* | 5/2006 | Meyer et al. | .................... | 714/4 |
| 7,188,292 B2* | 3/2007 | Cordina et al. | .............. | 714/748 |
| 7,240,132 B2* | 7/2007 | Chen et al. | ..................... | 710/38 |
| 7,246,262 B2* | 7/2007 | Nagata et al. | ................... | 714/8 |
| 7,251,743 B2* | 7/2007 | Chen et al. | ..................... | 714/6 |
| 2003/0188035 A1* | 10/2003 | Lubbers et al. | ............. | 709/310 |
| 2004/0158777 A1* | 8/2004 | Bae et al. | ........................ | 714/47 |
| 2006/0020846 A1* | 1/2006 | Moody et al. | ................... | 714/2 |

* cited by examiner

*Primary Examiner*—Yolanda L Wilson
(74) *Attorney, Agent, or Firm*—Krishnendu Gupta; Robert Kevin Perkins

(57) ABSTRACT

This invention is a system and method for managing failover in a data storage environment. Program logic is configured for carrying out such method steps and encoded on a computer readable medium.

8 Claims, 11 Drawing Sheets

SYSTEM AND METHOD FOR MANAGING FAILOVER IN A DATA STORAGE ENVIRONMENT

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to U.S. patent application Ser. No. 11/238,512 filed on even date with the present U.S. patent application and entitled "System And Method For Managing And Scheduling Recovery After A Failure In A Data Storage Environment" and assigned to EMC Corporation the assignee of this application. This application is also related to U.S. patent application Ser. No. 11/238,561 filed on even date with the present U.S. patent application and entitled "Architecture for Managing Failover and Recovery after Failover in a Data Storage Environment" and assigned to EMC Corporation the assignee of this application.

FIELD OF THE INVENTION

This application generally relates to data storage management, and more particularly to management of failover during data replication

BACKGROUND

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data through the channels to the storage device and the storage device provides data to the host systems also through the channels. The host systems do not address the disk drives of the storage device directly, but rather, access what appears to the host systems as a plurality of logical disk units. The logical disk units (logical units, also known as LUNS) may correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure it is not lost due to problems with the computer systems, such as for example, loss of electrical power. However, there are costs and risks associated with backing up or otherwise copying or replicating data. Such costs include the data being unavailable to an application that may require access to it. For example, in a normal business operation, not as a production environment, data may be needed for an update or in relation to a transaction on a close to full-time (i.e. 24 hours a day, 7 days a week) basis. A risk associated with replicating data is that there may be a failure in the replication path affecting any of the hardware or software involved with the replication. What is needed is a way of managing such failure so that replication may occur in the event of failure in a relatively short amount of time.

SUMMARY OF THE INVENTION

To overcome the problems of the prior art mentioned above and to provide advantages also described above, this invention in one embodiment is a method for managing failover in a data storage environment. The method embodiment includes the steps of being responsive to a failure occurring during the copy session by stopping data transfer associated with the copy session that experiences the failure. During the period when copying is stopped, determining the specific failure mode, and the stopped data transfer is re-started and copying is allowed to continue in accordance with a recovery mode based on the specific failure mode.

In another embodiment a system is provided that includes program logic configured for carrying out the above-referenced method steps. In still another embodiment, program logic encoded on a computer-readable medium for carrying out such method steps is provided.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
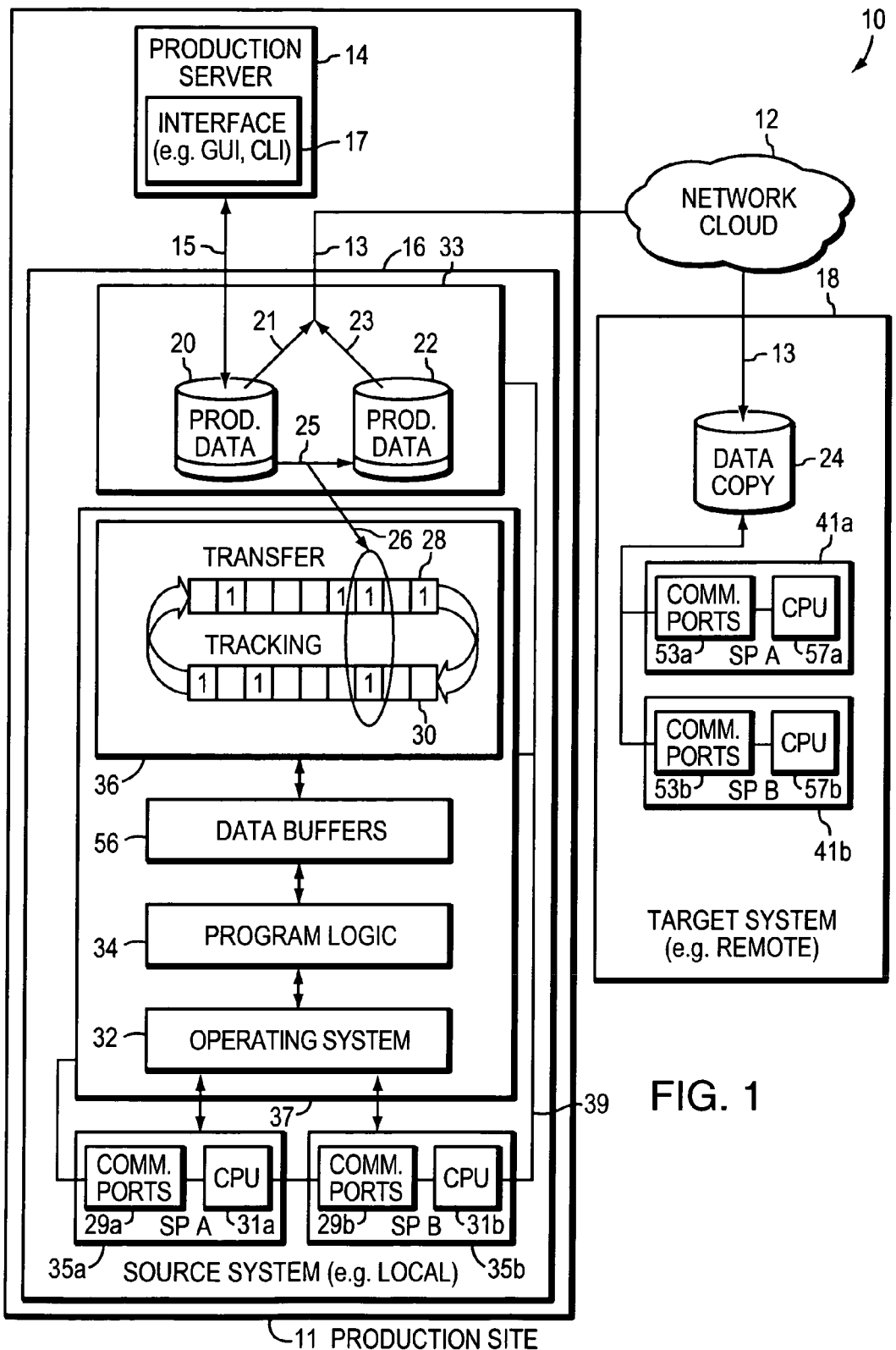
FIG. 1 shows a block diagram schematic of an embodiment of a data storage environment including one or more data storage systems and including a Production Site with a local data storage system and further including program logic for carrying out the method embodiments of the present invention, and also including a Target data storage system Site onto which data may be copied from the local data storage system.

In the preferred embodiment, the preferred invention operates in cooperation and may be a part of computer software, such EMC Corporation's SAN Copy software. SAN Copy is configured for allowing movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, SAN Copy is a storage-based implementation to remove impact from a server which may be hosting application software in a production environment.

Typically, SAN Copy operates in cooperation, with EMC's TimeFinder and SnapView local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

SAN Copy is an embodiment of an array to array copy technology and can also copy within the array itself. Data is transferred from a source array to a remote destination array with no attached server involvement pertaining to the data movement (strictly storage array to array data communication). Incremental SAN Copy is an enhancement to the SAN Copy product offered by EMC Corporation which allows customers to update data on remote arrays by sending only the modified data since the last time an incremental update had occurred.

With regard to some terminology in this application, it will be helpful to discuss some terms, shown in Table 1.

TABLE 1

General Terminology

COFW: copy on first write. Mechanism for maintaining a pointer based point in time copy of data. The COFW policy insures the original version of data is saved before allowing the data to be modified.
Incremental SAN Copy (ISC): a feature that provides users with the ability to perform incremental updates to copies of their production data. These copies can reside on the same array as the production data, or on remote arrays. The data transfer is array-to-array without server involvement. ISC is an extension to the SAN Copy product.
Incremental SnapView Session: a special SnapView Session that is created specifically for an ISC Session. These sessions are used to track which data areas of the source data are modified as well as protect the user selected point-in-time copy of the data while an incremental copy is in progress.
Chunk: A chunk is a contiguous piece of data, which will be returned by Snapview in a GetNext buffer. Several chunks could be returned in a GetNext buffer.
GetNext: This is a private interface between SAN Copy and SnapView to read the data
Granularity: This is the chunk size of the changes being tracked on the source LU.
Buffer Space: This is the total amount of memory allocated to hold the Getnext data.
Buffer Space = Buffer Size * Buffer Count.
SANCopy Session: Copies the data on a source logical unit (LUN; defined below) to one or many destination LUNS. A full SANCopy session copies all the data on the source LUN to one or many destination logical units. On the other hand, an incremental SANCopy session copies only the data changed on the source LUN, since the last incremental copy session, to one or many destination LUNS.
Logical Unit or LUN: A data volume that logically represents a physical volume of data storage

Overview of a Preferred Embodiment

In a preferred embodiment, Program Logic cooperates with and may include EMC Incremental SAN Copy features that use the EMC SAN Copy and EMC SnapView program code and may also receive instructions from users through the GUI or CLI, or through dynamically linked other programs. One skilled in the art will recognize that the invention is not limited to such preferred embodiments; however, they are described herein as an example of implementing the invention. Returning to an exemplary embodiment overview, the user can specify the point-in-time copy of the data to be transferred to the remote arrays by "marking" the data via an administrative command. Any time after the data has been "marked"; the user can initiate the SAN Copy transfer of the data to one or more remote arrays. After an initial full copy, subsequent copies will only copy portions of the production data that changed since the previous copy. Preferably, the communication and user input is provided by using some type of Administration program, e.g. EMC's Navisphere CLI or GUI product.

Preferred Embodiment Description

Referring to FIG. 1, Data Storage Environment 10 includes a Production Server 14 with an Interface 17 (e.g. a graphical user interface a.k.a. GUI or command line interface a.k.a. CLI) for communicating with Local Data Storage System 16 across path 15, and in particular for accessing Production Data 20, wherein Production Data Copy 22 is typically COFW data made for consistency and indicated along copy path 25, and wherein tracking actions along path 26 will be discussed below. The Production Data 20 is updated by write requests along path 15 in Server I/O, which results in regions of modified storage tracked by a tracking session 36. An incremental tracking session 36 on the Data Storage System 16 supports an incremental copy feature, such as the preferred Incremental SAN Copy feature available from EMC Corporation. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can be physical volumes, although logical volumes are preferred. Devices and volumes in a logical sense are also used interchangeably throughout. Note also that throughout this document, like symbols and identical numbers represent like and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume.

Generally, such a data storage system as those described herein includes a system memory and sets or pluralities of multiple data storage devices. The system memory can comprise a buffer or cache memory; the storage devices in the pluralities can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end, and ports communicating from a data storage system toward each respective end are termed, respectively, front end ports and back end ports. Also disks may be addressed logically using logical volumes also known as logical units also interchangeably referred to many who are skilled in the data storage computer arts as either LU's or LUN's, wherein the LU's or LUN's represent volumes of physical data on data storage devices such as disks. Mapping is used between such LUN's and physical data to achieve the representation. A bus interconnects the system memory, and communications with front and back end.

In a preferred embodiment the tracking session 36 is part of EMC's SAN COPY or Snapview product, or follow on products including Mirrorview and Mirrorview Asynchronous (also known as Mirrorview-A) and preferably includes: (1) maintenance of two data structures, which for purposes of simple explanation are shown as bitmaps (but one skilled in the art will recognize that the invention is not limited to a specific data structure such as bitmaps), transfer bitmap 28 and tracking bitmap 30 for tracking incremental changes to the production data (the roles of the transfer and tracking bitmaps switch whenever a session is marked); (2) the ability to mark and unmark a point in time associated with a session; (3) reduced COFW overhead on access to Production Data 20 and 22, preferably in non-volatile memory 33, such as a computer hard drive, including: (a) No COFWs unless the session is marked; (b) COFWs only occur if the data had been marked to be copied in the transfer bitmap; and (c) the probability of having to perform a COFW diminishes while an ISC is in progress.

Generally, in a preferred embodiment the two bitmaps may be used by the Program Logic 34 in cooperation with the operating system 32, and the CPU 31a or 31b on the source data storage system 16 if incremental copying is being done. CPU 31a and 31b are included respectively with Storage Processors 35a and 35b, which are also referred to as SP A or SP B, respectively. SP A and SP B also respectively include Communication Ports 29a and 29b (COMM. Ports). The bitmaps and Program logic operate in electronic memory 37 and when executed by CPU 31a-b over communication path 39 carry out method steps embodying the invention. (It should be noted that the Program Logic could also be executed by other CPU's such as CPU 57a-b). It is preferred that the Program Logic be computer software although it may be possible for some or all of it to be embodied in hardware or firmware. The Program Logic 34 (FIGS. 1, 2 and 11) in a preferred embodiment encompasses at least in part the integration of EMC's Snapview with Incremental SAN Copy and further with EMC's Mirrorview-Asynchronous product, each available from EMC of Hopkinton, Mass., USA. Data affected by this mechanism may span Storage Processors (e.g. SP A and SP B) in the storage array.

Figure 11:
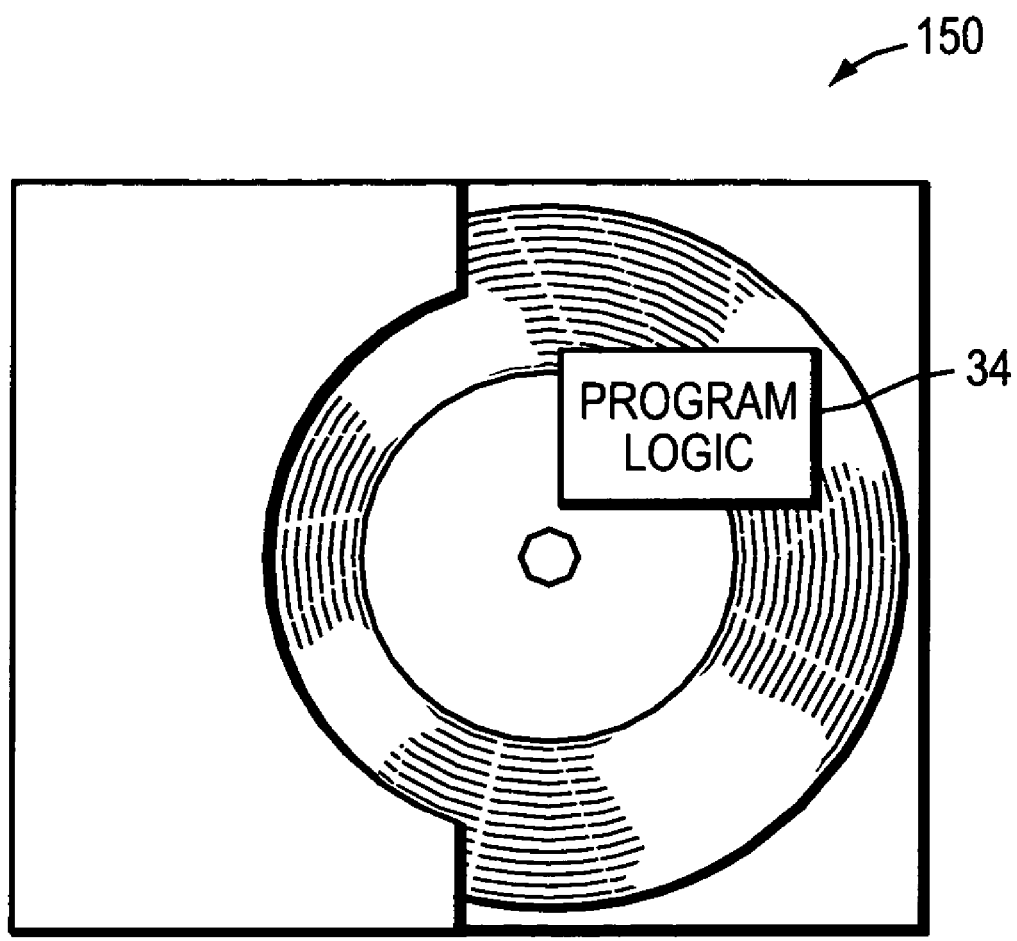
FIG. 11 shows a computer-readable medium including computer-executable code including at least some of the program logic of FIG. 1 for carrying out method steps of the method embodiments of the present invention.

Program Logic 34 may also be embodied on a computer-readable medium 150 as shown in FIG. 11, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Preferably, during the life of an Incremental Session, these two bitmaps swap their roles after a mark operation. After a session is marked, a COFW will be performed only if the transfer bitmap (which was the tracking bitmap before the mark) indicates that the specific region of the data is yet to be copied via ISC. Further, as the data is copied, the regions corresponding to the data transferred in the transfer bitmap are cleared which further reduces the amount of COFW activity needed. As the transfer proceeds, the probability of having to perform a COFW diminishes. These optimizations may significantly reduce the number of COFWs necessary to maintain a consistent copy of the production data and are an improvement of prior art systems that may include known pointer-based snapshot technologies.

Referring again to FIG. 1, Production Data 20, as it pertains to this invention, exists in two states: marked and unmarked. All write requests to Production Data, that has an incremental session associated with it, are tracked (i.e., records of regions on the storage where the change occurred is maintained in the tracking bitmap). Prior to making an incremental copy to Data Copy 24 on a Target or Remote Data Storage System or Storage Array 18, over a network cloud 12, which may be for example a wide area network, the state of the data is transitioned to indicate marked. CPU 57a and 57b are included respectively with Storage Processors 41a and 41b, which are also referred to as SP A or SP B, respectively. SPA and SPB also respectively include COMM. Ports 53a and 53b (COMM. Ports).

In a preferred embodiment, the tracking bitmap becomes the transfer bitmap and a cleared transfer bitmap is used as the tracking bitmap. Thus, the role of the tracking and transfer bitmaps will switch each time data is marked. This switching of roles should be atomic in nature with respect to Production Server 14 writes to the Production Data 20. Changes to the Production Data since the last incremental copy are copied to one or more remote arrays only when the data is in the marked state. As soon as an incremental copy is completed the state of the production data is reverted to unmarked by the Program Logic 34.

The ISC process will transfer the regions indicated in the transfer bitmap. While the production data is being transferred, new server write requests are tracked for the next transfer. If a server write request is destined to modify a region that is going to be transferred (the transfer bitmap indicates that region is to be transferred), the data at the time of the mark needs to be preserved. The preferred incremental SnapView will perform a COFW of the region before the server write request is allowed to proceed. The ISC transfer, when it gets to the region that had a COFW performed upon it, will transfer the data that has been saved via the COFW. After a region has been transferred via ISC, the region in the transfer bitmap is cleared. This will reduce the probability of having to perform a COFW as the ISC proceeds. A COFW should be performed if the region indicated in the transfer bitmap is being overwritten before the regions have been transferred to the remote array or the resultant data copy will be inconsistent. This is represented by copy path 25 indicating a COFW from Production Data 20 to Production Data Copy 22. Along Path 26, changes to the transfer and tracking bit maps indicate the state of data that may be later transferred to Data Copy 24. Along path 21 and 23, data regions marked by the transfer bit map from either the Production Data or COFW Production Data Copy are sent over path or link 13 through Network Cloud 12 to Data Copy 24 on the Target 18. One skilled in the art will recognize that the Data Copy 24 could also reside on the same array or data storage system as the Production Data, but there are advantages related to availability of data in sending it to another system.

FIG. 1 also shows data buffers 56 that are memory resources for data transfer between the source and target system that are managed by components of the program logic 34, and specifically a copy manager driver that will be discussed below in detail, and in relationship to the communication (comm.) ports 29 of the source system. The comm. ports include front end and back end ports that are also discussed herein.

Copy Manager Embodiment

Figure 2:
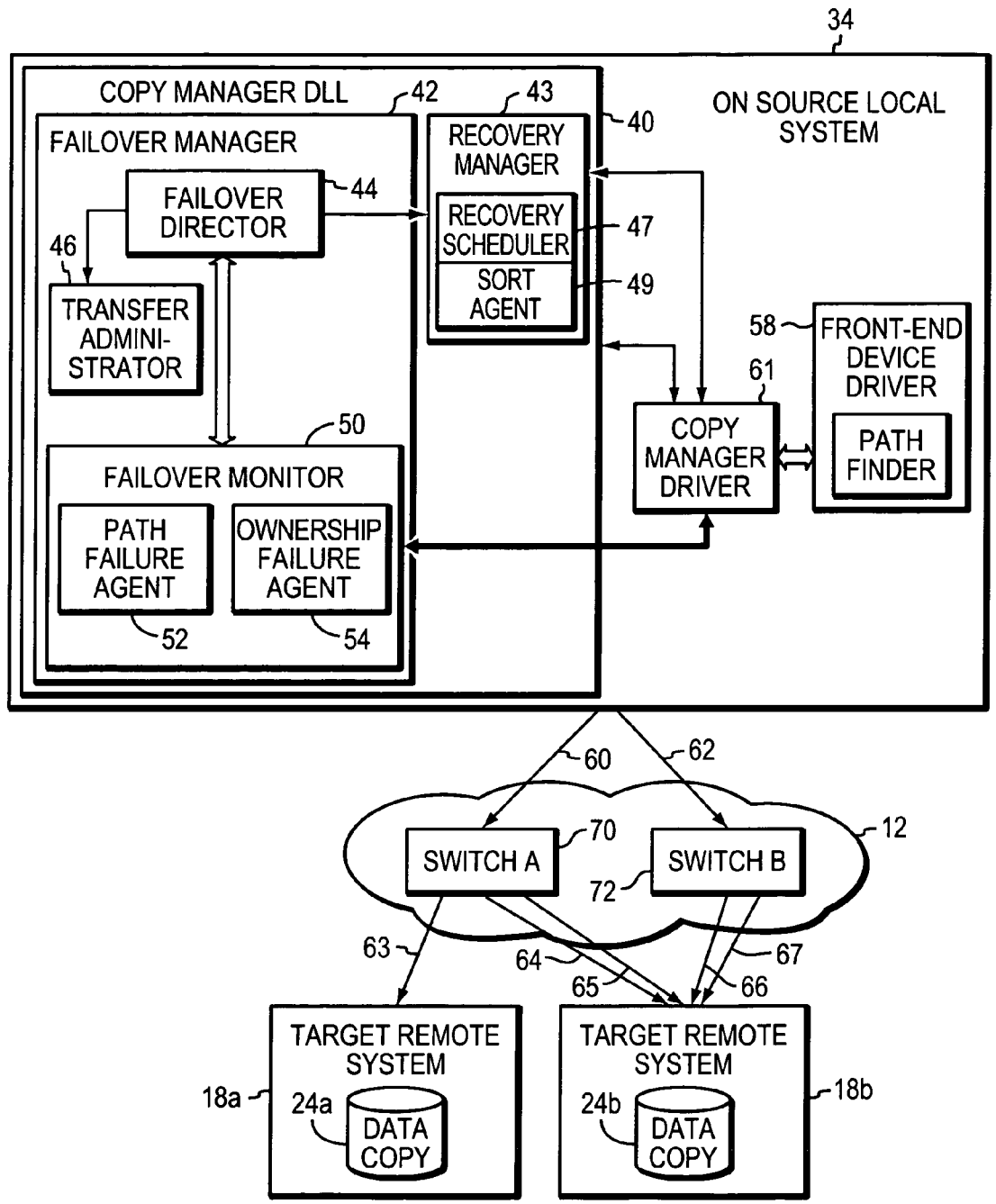
FIG. 2 shows another schematic block diagram including a depiction of functional relationships of components of the program logic of FIG. 1 and acting on data of the one or more data storage systems of FIG. 1, and wherein the program logic architecture includes a failover manager and a recovery manager.

Referring to FIG. 2, an embodiment of Program Logic 34 that includes a Copy Manager dynamic link library (CPM DLL) 40 manages the copy sessions that copy data using the Copy Manager Driver 61. The CPM DLL includes a Failover Manager 42 and Recovery Manager 43, which is a unique architecture that provides advantages discussed herein. The Copy Manager 61, which manages the Data Buffers is also part of the Program Logic software that operates in the preferred Clariion Data Storage System from EMC and operates as and communicates with software drivers that are also part of the Program Logic in the preferred Clariion. Such drivers include, in a preferred embodiment, the Copy Manager Driver 61 and Front-End Device Driver 58, which includes a Path Finder functionality discussed below. The Front-End Device communicates with the Copy Manager and the COMM. Ports 29a-b (FIG. 1).

The Copy Manager copies data between LUNs (front end or back end). The Copy Manager receives instruction from I/O controls through its DLL structure or indirectly through a user interface-based instruction. One of the functions of the Copy Manager is to copy data from a source LUN to a destination LUN, but this function allows the Copy Manager to be used in a new way for both failover and recovery management The Copy Manager Driver fits in with a collection of Drivers in a preferred Clariion including the Front-End Device Driver as shown in FIG. 2. The Front-End Device Driver 58 provides support for sending initiator-mode I/O requests to a standard SCSI Port Driver (not shown), which in turn communicates with the COMM. Ports (FIG. 1). The data buffers 56 are allocated by the Copy Manager Driver 61.

FIG. 2 illustrates the Copy Manager DLL in more detail and describes its functional components. The Copy Manager accepts SCSI copy commands such as the Extended Copy Command and other Copy Commands that may be native to a particular data storage system, such as the preferred Clariion, and with the preferred SAN COPY, Snapview, and/or Mirrorview Asynchronous program code may include Complex, or Simple Copy Commands, and puts the respective commands onto one or more "streams" of input to the Copy Manager.

An example use case is illustrated in the schematic showing the architecture of the Copy Manager and the rest of the Program Logic including the Copy Manager Driver and Front-End Device Driver. In the example case, a SANCopy session is currently in progress copying data from production data from local source system 16 to Data Copy 24a on Target remote system 18a and Data Copy 24b on Target remote system 18b. The SANCopy session is using Path 60-63 in Network Cloud 12 to transfer the data to DataCopy 24a and Path 62-66 to transfer data Data Copy 24b. In the example case, due to some failure (e.g., hardware failure, or power failure) Switch B 72 has a failure resulting in failure on path 62-66 and 62-67. The current copy progress is 50%. The Front-End Device Driver 58 will then communicate the failure back up to the Copy Manager Driver 61, which will stop the data transfer to Data Copy 24b in the SANCopy session. The Path Failure Agent 52 in the Failover Monitor 54 will detect this failure as a path failure and communicate that to the Failover Director 44. Meanwhile the SANCopy continues to copy to Data Copy 24 over Path 61-63 and progress is 56%. The Failover Director 44 will then direct for stopping the copying in some manner such as abortion of the SANCopy session (which is continuing to copy data to Data Copy 24a over path 61-63). The Director 44 then manipulates the starting offset of the copy session to be 50% (the least of copy progress to all destinations involved in the copy session). The Director 44 then would communicate to the Copy Manager Driver 61, through the Recovery Manager 43, to restart the SANCopy session. The Path Finder component in the Front-End device driver 58 now finds a valid available path 61-63 to reach Data Copy 24a and path 61-64 to reach Data Copy 24b. The SANCopy session now continues to copy and completes the process to 100%, overcoming a single path failure in between.

Referring again to FIG. 2, the Failover Module 50 includes the Transfer Administrator 46 and the Ownership Failure Agent 54. The Transfer Administrator is the functional module that transfers the copy session from peer SP to local SP when its deemed necessary by the Failover Director 44. The Ownership Failure Agent 54 is the functional module that identifies a copy session failure due to an un-owned LU on the SP (currently backend source LU failure) and communicates with the Failover Director 44 in order to recover the copy session if possible. Once the copy session is transferred the Failover Director 44 will manipulate the necessary parameters (like setting the start offset of the copy to be the previous amount of data it copied) and get the Recovery Manager 43 to re-start the copy session by sending it to the Copy Manager Driver 61. Thus the copy session continues to completion on SP A, by failing over from SP B.

FIG. 2 also shows a Recovery Manager 43 that is part of the Copy Manager DLL 40. The Recovery Manager includes a Recovery Scheduler 47 that schedules recovery operations that occur responsive to a failure and failover operations. The Recovery Manager also includes a Sort Agent that works with the Recovery Scheduler for sorting copy sessions. More detail regarding recovery and the Recovery Manager is described below with reference to FIGS. 9 and 10.

Figure 3:
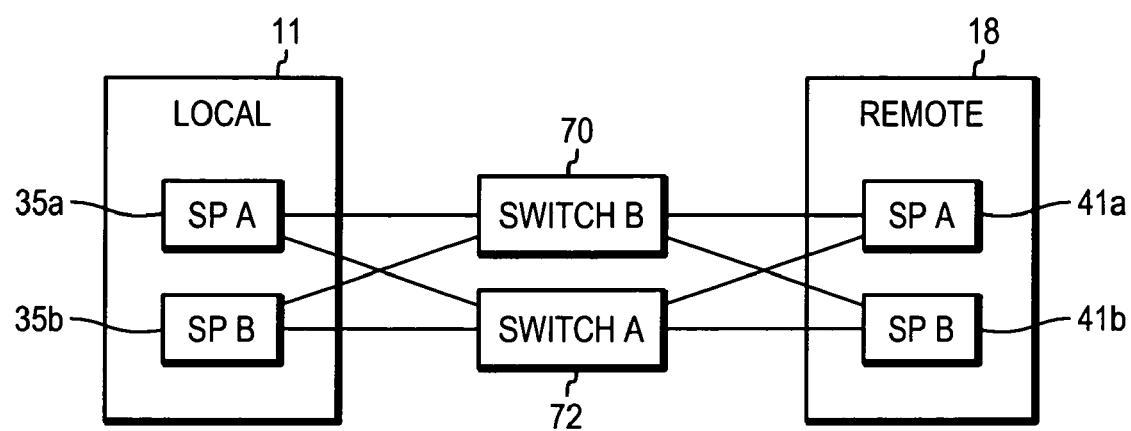
FIG. 3 shows a simplified schematic block diagram of a preferred high-availability arrangement for the data storage systems of FIG. 1 employing the program logic of FIG. 1.

Referring to FIG. 3 is a schematic showing of a preferred configuration for ensuring high availability of replication or copying to the Target Data Copy. The array is configured for high availability, which is denoted High Availability (HA). HA presumes that both the SP's on the array with the preferred SANCopy portion of Program Logic installed are configured appropriately to be able to establish a connection to the required front-end LU's of the copy session. It is recommended that before the SANCopy Session is started that an administrator interface with the Program Logic 34 through the CLI or GUI Interface 17 (FIG. 1) to configure the paths for HA. This would mean each SP 35a-b on the Local Data Storage System 11 has valid redundant paths to both the SP's 41a-b on the Target or Remote Data Storage System 11. The path redundancy is routed through Switches 70-72.

Definitions related to Failover operation and the Failover Manager are shown in Table 2:

TABLE 2

Definitions related to Failover

Local Array/SP: Array/SP/ that has SAN Copy session running on it. SANCopy is installed on this array
Remote Array/SP: Array/SP/ that has the source or the destination of a SANCopy session but SANCopy session is not running on that array
Backend/Local LU: LU on the Local Data Storage System or Array
Front-end/Remote LU: LU on the Target or Remote Local Data Storage System or Array
Target LU: SANCopy target LU to copy from or copy to. e.g., a source LU or a destination LU.

Following are other definitions, used herein, which are described with the nomenclature and within the context of the preferred Clariion data storage system environment, are applicable in any data storage system environment.

Trespassing is the Clarion term for reassignment of a Logical Unit. Reassignment on an active-passive storage system involves movement of logical devices (an LU or LUN) from one storage system interface (a Storage Processor in Clarion systems) to another. An Active-Passive (Storage Systems) is a type of storage system in which, if there are multiple interfaces (Storage Processors in Clarion systems) to a logical device, one is designated as the primary route to the device; the device is "assigned" ("owned" in Clarion terminology) to that interface (SP). I/O cannot be directed to paths connected to a non-assigned interface.

In summary LU Trespass in Clarion terminology means transferring the ownership of the LU from one SP to another. As Clarion systems are Active-Passive it means only one SP owns a LU at a time, and the other SP is passive with respect to that LU and waiting to take over if needed. The LU can only be accessed by the host to send I/O's from the SP that owns the LU at the time.

An LU Failure means there is a logical or physical failure due to which an I/O sent to that LU fails. The failure could be because of a number of things, such as the disks making up the LU are physically bad, power failure to the disks, bus failure etc.

An Ownership Failure means that I/O sent to an LU from a SP fails because the SP does not own that LU. A focus of the Failover Manager is this situation where a copy session can't continue because an I/O fails to the LU when the LU is owned by the different SP than the one to which the I/O was sent.

An Auto-Transfer is an option per copy session provided to the user that can be turned 'on' or 'off'. It means in the case where I/O's can't be directed to the source LU from a given SP because peer SP owns the LU, setting this option to 'on' will allow SANCopy to automatically transfer the copy session to peer SP and continue the copy session in a failover scenario.

A Target-Trespass is another option per target LU in the copy session provided to the user that can be turned 'on' or 'off'. It means in the case where the Target LU (source or the destination of the copy) can't be accessed because the SP on the Storage System to which the I/O was sent does not own the LU, but the peer SP on the Storage System does, automatically trespass the LU to the peer SP on the Storage System and send I/Os to that SP to continue to the copy session.

A new concept of a copy session ownership will be introduced internally in the CPM DLL. The CPM DLL will track the currently designated default owner SP of the copy session by SAN Copy.

Following are policies SAN Copy uses to maintain this ownership tracking—

The SP on which the copy session is created is considered its default owner.

The default ownership of the copy session is changed to the SP to which it is administratively transferred (through a user command).

The default ownership of the copy session is changed to the current SP by turning off the Auto-Transfer option.

SAN Copy will start a copy session on the SP that is its default owner as determined by SAN Copy. The only time a copy session can be on a non-owning SP is if the copy session is active/running in a failover scenario with Auto-Transfer turned 'on' case. When the copy session completes, SAN Copy will transfer/fail-back the copy session to the owning SP if Auto-Transfer is enabled.

A copy session in progress requires fail over consideration in the following cases shown in Table 3.

TABLE 3

Front-end Failover
    Single Path Failure
    LU Failures
        Source LU Failure
        One or more Destination LU Failure
    LU Trespass
        Source LU Trespass
        One or more Destination LU Trespass
    All Paths Failure from Local SP to Remote SP
        Source LU on Remote Array
        Destination LU's on Remote Array
    All Paths Failure from Local SP to Remote Array
        Source LU on Remote SP
        Destination LU's on Remote Array
    All Paths Failure from Local Array (All path failure)
        Source LU on Remote SP
        Destination LU's on Remote Array
Backend Failover
    LU Failures
        Source LU Failure
        One or more Destination LU Failure
    LU Trespass
        Source LU Trespass
        One or more Destination LU Trespass
Local SP Failover
    Peer SP failure with SAN Copy Session in-progress
    SP boot-up Table 4 shows Failover functionality for each of the above cases using the Fail Over implemented by the Failover Manager in accordance with a preferred policy.

TABLE 4

Fail Over Functionality

| | |
|---|---|
| Transfer | Transfer the copy session to the peer SP. Trespass all backend target LU's that have Target-Trespass enabled. Trespass front-end target LU's that have Target-Trespass enabled, if required. Restart the Copy Session. |
| Trespass | Trespass the target LU to the peer SP |
| Fails | Fail the Copy Session |
| Stops | Stop copying to the inaccessible destination LU's while continuing the copy to any remaining destination LU's. if there are no remaining destination LU's, the Copy Session fails. |
| Failback | Transfer the copy session back to its owning SP. |
| NOP | No operation. |

LU failure can happen due to a fault on the LU, bus failures and other hardware failures. Recommended policy and use of the Logic is given in the following Tables, wherein Tables 5-8 are for Front-end failures.

TABLE 5

Source LU Failure (Front-End)

| | Auto-Transfer is ON | Auto-Transfer is OFF |
|---|---|---|
| When Copy starts | | |
| Target-Trespass is ON | Fails | Fails |
| Target-Trespass is OFF | Fails | Fails |
| Copy is in progress | Auto-Transfer is ON | Auto-Transfer is OFF |
| Target-Trespass is ON | Fails | Fails |
| Target-Trespass is OFF | Fails | Fails |

TABLE 6

One or more Destination LU Failure (Front-End)

| | Auto-Transfer is ON | Auto-Transfer is OFF |
|---|---|---|
| When Copy starts | | |
| Target-Trespass is ON | Stops | Stops |
| Target-Trespass is OFF | Stops | Stops |
| Copy is in progress | Auto-Transfer is ON | Auto-Transfer is OFF |
| Target-Trespass is ON | Stops | Stops |
| Target-Trespass is OFF | Stops | Stops |

TABLE 7

Source LU Trespass (Front-End)

| | Auto-Transfer is ON | Auto-Transfer is OFF |
|---|---|---|
| When Copy starts | | |
| Target-Trespass is ON | Trespass | Trespass |
| Target-Trespass is OFF | Transfer[3] | Fails |
| Copy is in progress | Auto-Transfer is ON | Auto-Transfer is OFF |
| Target-Trespass is ON | Transfer[3] | Fails[1] |
| Target-Trespass is OFF | Transfer[3] | Fails |

The following notes pertain to the superscripts within the tables:
[1]This policy will avoid the repetitive passing back and forth the target LU between SP's because of a host trespass and SAN Copy trespass.
[2]SAN Copy will transfer the copy session to the peer SP only if there exists a valid path from the peer SP to the front-end target LU. Otherwise the copy session fails.
[3]On the restart of the copy session the front-end targets will follow the front-end failover policy.
[4]SAN Copy will restart the copy session with the default throttle value.

TABLE 8

One or more Destination LU Trespass (Front-End)

| | Auto-Transfer is ON | Auto-Transfer is OFF |
|---|---|---|
| When Copy starts | | |
| Target-Trespass is ON | Trespass | Trespass |
| Target-Trespass is OFF | Stops | Stops |
| Copy is in progress | Auto-Transfer is ON | Auto-Transfer is OFF |
| Target-Trespass is ON | Stops[1] | Stops[1] |
| Target-Trespass is OFF | Stops | Stops |

Figure 4:
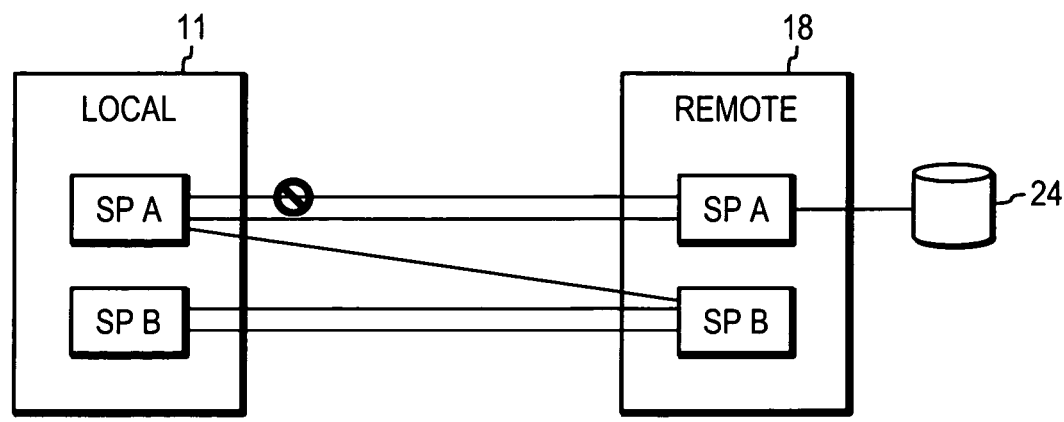
FIG. 4 shows another simplified schematic block diagram of the data storage systems of FIG. 1 illustrating an example of managing a case of failover.

Exemplary cases where the Failover Manager is useful are described with reference to FIGS. 4-8 below. Referring to FIG. 4, a single path failure is depicted. Regarding nomenclature, the symbol of a circle with a slash across it is used to indicate a failure of a path in the FIGS. 4-8. A Single Path Failure is a front-end failure where the current path SAN Copy is using from the local SP to the front-end target LU fails, and there exists another valid path to the same front-end target LU. If there are no remaining valid paths, this case becomes the all paths failure discussed in later sections.

FIG. 4 is an illustration of the case where the current path the copy session is using from local SP to front-end target LU fails, and there exists another valid path to the same front-end target LU. In this case SANCopy will recover from the single path failure by failing over to the valid path and continue the copy session to completion.

Table 9 shows the recommended policy for single path failure.

TABLE 9

Single Path Failure

| | Auto-Transfer is ON | Auto-Transfer is OFF |
|---|---|---|
| When Copy starts | | |
| Target-Trespass is ON | Find another valid path | Find another valid path |
| Target-Trespass is OFF | Find another valid path | Find another valid path |
| Copy is in progress | Auto-Transfer is ON | Auto-Transfer is OFF |
| Target-Trespass is ON | Find another valid path | Find another valid path |
| Target-Trespass is OFF | Find another valid path | Find another valid path |

LU failure can happen due to a double fault on the LU, bus failures and other hardware failures. These cases are trivial, but included for completeness. Recommended policy and actions for Back-End Failures are in Tables 10-13.

TABLE 10

Source LU Failure (Back-End)

| When Copy starts | Auto-Transfer is ON | Auto-Transfer is OFF |
|---|---|---|
| Target-Trespass is ON | Fails | Fails |
| Target-Trespass is OFF | Fails | Fails |
| Copy is in progress | Auto-Transfer is ON | Auto-Transfer is OFF |
| Target-Trespass is ON | Fails | Fails |
| Target-Trespass is OFF | Fails | Fails |

TABLE 11

One or more Destination LU Failure (Back-End)

| When Copy starts | Auto-Transfer is ON | Auto-Transfer is OFF |
|---|---|---|
| Target-Trespass is ON | Stops | Stops |
| Target-Trespass is OFF | Stops | Stops |
| Copy is in progress | Auto-Transfer is ON | Auto-Transfer is OFF |
| Target-Trespass is ON | Stops | Stops |
| Target-Trespass is OFF | Stops | Stops |

Figure 5:
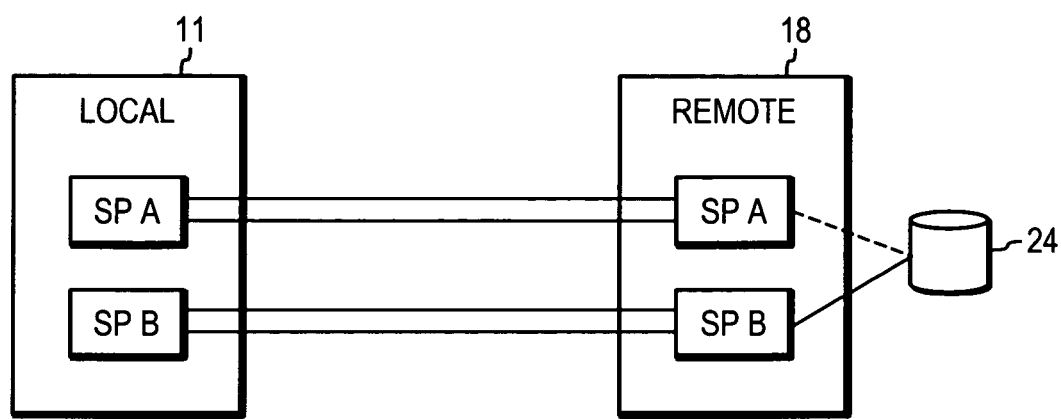
FIG. 5 shows another simplified schematic block diagram of the data storage systems of FIG. 1 illustrating an example of managing a case of failover.

Referring to FIG. 5, LU Trespass is the case when the Front-end target LU trespasses to the Remote peer SP and there is no valid path from SP on the Local System owning the LU to the peer SP on Remote System 18. Thus the case becomes where there exists a valid path from local SP to only the non-owning remote SP of the target LU. The to copy session is on local SP A in this example.

Tables 12 and 13 show the policy for LU Trespass according to whether it is Source or Destination LU Trespass.

TABLE 12

Source LU Trespass (Back-End)

| When Copy starts | Auto-Transfer is ON | Auto-Transfer is OFF |
|---|---|---|
| Target-Trespass is ON | Trespass | Trespass |
| Target-Trespass is OFF | Transfer[2] | Fails |
| Copy is in progress | Auto-Transfer is ON | Auto-Transfer is OFF |
| Target-Trespass is ON | Transfer[2] | Fails[1] |
| Target-Trespass is OFF | Transfer[2] | Fails |

TABLE 13

One or more Destination LU Trespass (Back-End)

| When Copy starts | Auto-Transfer is ON | Auto-Transfer is OFF |
|---|---|---|
| Target-Trespass is ON | Trespass | Trespass |
| Target-Trespass is OFF | Stops | Stops |
| Copy is in progress | Auto-Transfer is ON | Auto-Transfer is OFF |
| Target-Trespass is ON | Stops[1] | Stops[1] |
| Target-Trespass is OFF | Stops | Stops |

Figure 6:
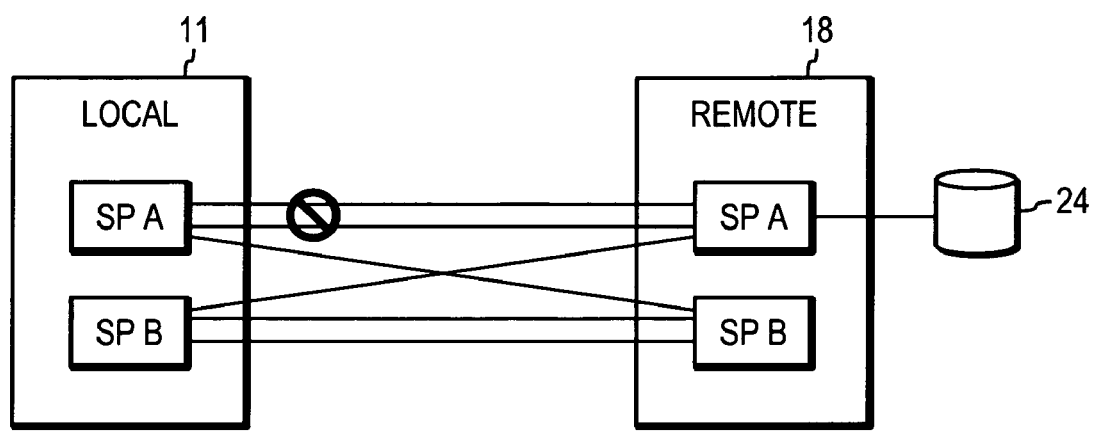
FIG. 6 shows another simplified schematic block diagram of the data storage systems of FIG. 1 illustrating an example of managing a case of failover.

FIG. 6 shows the case where hardware failures make all paths from the local SP on System 11 to the remote peer on System 18 inaccessible. From SAN Copy functionality point, this policy can be handled just like that for Trespass as shown in Table 12.

Figure 7:
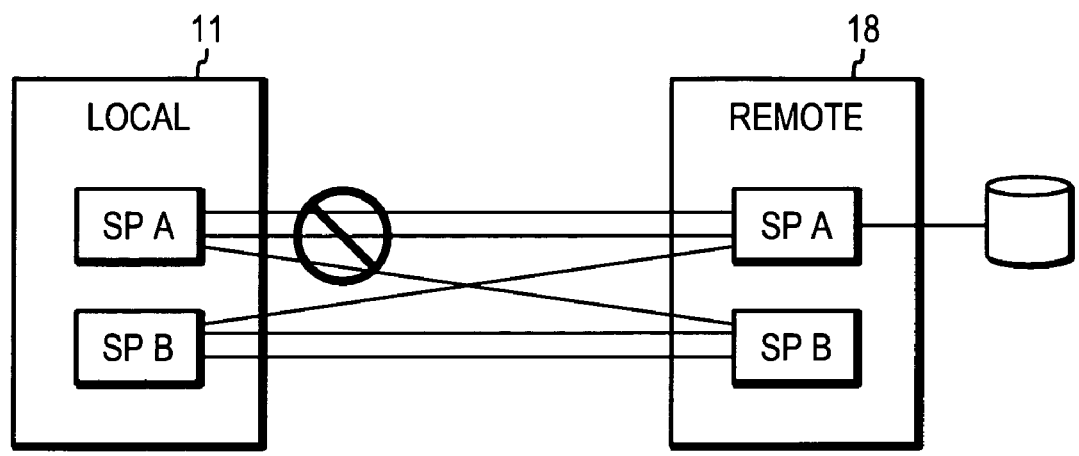
FIG. 7 shows another simplified schematic block diagram of the data storage systems of FIG. 1 illustrating an example of managing a case of failover.

FIG. 7 shows the case where there are any hardware failures causing all the paths from local SP on Local System 11 to both the remote SP's on Remote System 18 to become inaccessible, but the local peer SP has a valid path to the remote array. FIG. 7 depicts the case with copy session on local SP A. Tables 14 and 15 show the appropriate policy depending on where the Source LU is located.

TABLE 14

Source LU is on the Remote Array (All Paths)

| When Copy starts | Auto-Transfer is ON | Auto-Transfer is OFF |
|---|---|---|
| Target-Trespass is ON | Transfer | Fails |
| Target-Trespass is OFF | Transfer | Fails |
| Copy is in progress | Auto-Transfer is ON | Auto-Transfer is OFF |
| Target-Trespass is ON | Transfer | Fails |
| Target-Trespass is OFF | Transfer | Fails |

TABLE 15

Destination LU's on Remote Array (All Paths)

| When Copy starts | Auto-Transfer is ON | Auto-Transfer is OFF |
|---|---|---|
| Target-Trespass is ON | Stops | Stops |
| Target-Trespass is OFF | Stops | Stops |
| Copy is in progress | Auto-Transfer is ON | Auto-Transfer is OFF |
| Target-Trespass is ON | Stops | Stops |
| Target-Trespass is OFF | Stops | Stops |

ALL Path Failure from Local Array

Figure 8:
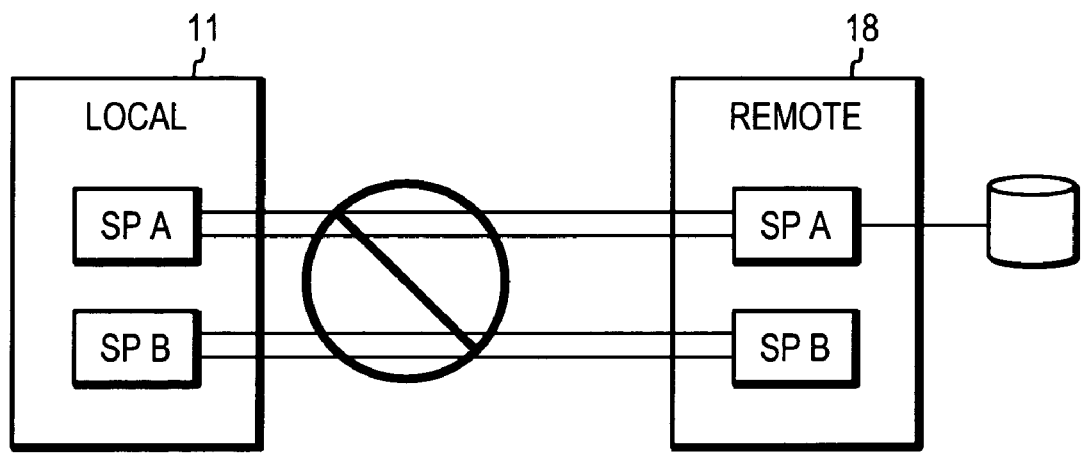
FIG. 8 shows another simplified schematic block diagram of the data storage systems of FIG. 1 illustrating an example of managing a case of failover.
Figure 10:
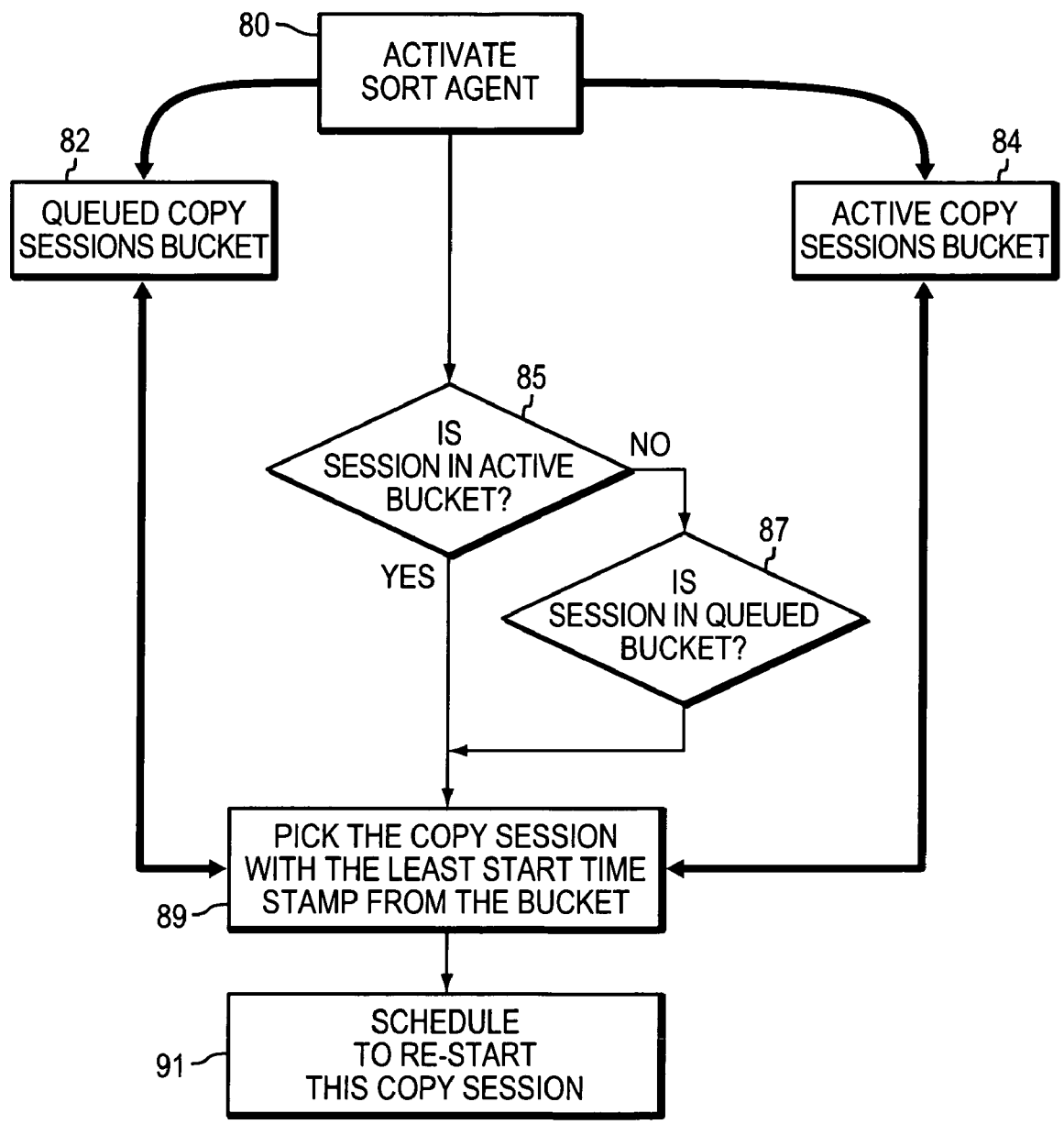
FIG. 10 shows another flow logic diagram of steps for carrying out method embodiments of the present invention employed by the recovery manager of the program logic of FIG. 1.

FIG. 8 shows the case if there is a dual SP failure on the remote array or all other hardware failures causing all the paths from the local array (both the SP's on the array) to become inaccessible. From SAN Copy functionality this case is same as backend LU failure as shown in FIG. 10. Refer to FIG. 10 for SAN Copy failover policy for this case. FIG. 8 depicts the case with copy session on local SP A.

These are the cases where an SP failure or boot-up occurs on the SAN Copy local array. FIGS. 16-17 show the appropriate and recommended policy for such a case.

TABLE 16

Peer SP failure with SAN Copy Session in-progress

| Copy is in progress | Auto-Transfer is ON | Auto-Transfer is OFF |
|---|---|---|
| Target-Trespass is ON | Transfer (Trespass any backend targets)[3] | Fails (User can manually Transfer) |
| Target-Trespass is OFF | Transfer (Trespass any backend targets)[3] | Fails (User can manually Transfer) |

SP Boot-Up

It is not necessary to consider the Target-Trespass option in this case. If the copy restarts and fails the failover policies as discussed in previous section will apply.

TABLE 17

| | Auto-Transfer is ON | Auto-Transfer is OFF |
|---|---|---|
| Session owned by this SP is Active on Peer SP | | |
| Auto-Restart is ON | Failback and Restart the Copy[3] | N/A |
| Auto-Restart is OFF | Prohibited Condition | N/A |
| Session owned by this SP is failed on Peer SP | Auto-Transfer is ON | Auto-Transfer is OFF |
| Auto-Restart is ON | Failback and Restart the Copy[3] | N/A |
| Auto-Restart is OFF | Prohibited Condition | N/A |
| Session owned by this SP is complete on Peer SP | Auto-Transfer is ON | Auto-Transfer is OFF |
| Auto-Restart is ON | Failback | N/A |
| Auto-Restart is OFF | Prohibited Condition | N/A |
| Session was active on booting SP | Auto-Transfer is ON | Auto-Transfer is OFF |
| Auto-Restart is ON | Restart the copy[3] | Restart the copy[3] |
| Auto-Restart is OFF | Prohibited Condition | NOP |

The only time a copy session can be on a non-owning SP is if the copy session was active/running in a failover scenario with Auto-Transfer option enabled. When copy session ceases to be active on a non-owning SP, SAN Copy will failback the copy session to owning SP. The failover operations performed by SAN Copy will be recorded in a user visible log so that the user can trace the auto-failover.

Figure 9:
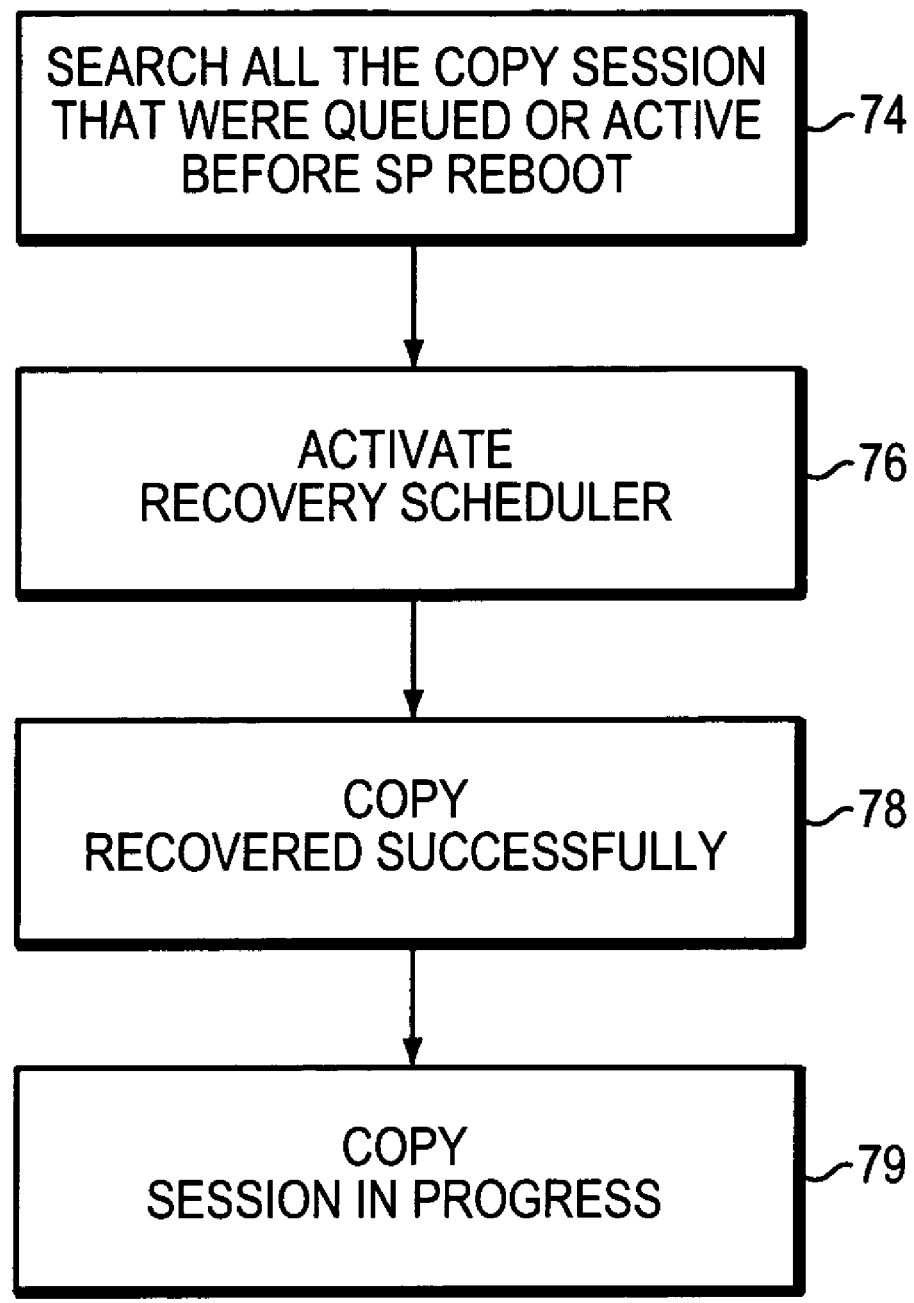
FIG. 9 shows a flow logic diagram of steps for carrying out method embodiments of the present invention employed by the recovery manager of the program logic of FIG. 1.

Referring to FIG. 9, a Flow Logic diagram showing operation of the Recovery Manager 43 is detailed. The Recovery Manager provides a way to continue the copy session on an SP in failure or failover case. One function of Recovery Manager is to continue a copy session on an SP reboot without manual intervention. An exemplary case would be a SAN-Copy session is running in the Copy Manager Driver 61. Power gets recycled to the SP running the SANCopy session. As soon as the SP is powered up again, the Recovery Manager using its functional components Recovery Scheduler and Sort Agent described later searches all the copy sessions that were queued or active before a SP re-booted in step 74. The Recovery Scheduler 47 is activated and all copy sessions that are found active are collected and dispatched to it to be scheduled to restart in the copy manager driver in step 78 and the copy session carried out in step 79.

FIG. 10 gives detail regarding operation of the Sort Agent 49 which is part of the Recovery Manager and which cooperates with the Recovery Scheduler. The Agent is activated in step 80 by the Scheduler. In step 82 and 84, respectively, the Sort Agent inspects the properties of each copy session from the copy sessions database making two buckets of copy sessions (i) those that were queued when the SP failed; and (ii) those that were active when the SP failed. In Step 89, the Scheduler then scans through all the copy sessions in the active sessions bucket to find the one marked with the earliest start time. The copy session is now dispatched to the Auto-Recovery manager to be re-started in Step 91. The Scheduler loops through to Step 84, back through Step 80, onto Step 85, and through Step 87 until the active sessions bucket is empty. Now the scheduler will scan through all the copy sessions in the queued sessions bucket to find the one marked with the earliest start time and dispatches it to be re-started (step 91 again). This loop continues until the queued sessions bucket is empty.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a first and second data storage system, and production data being stored on the first data storage system, and a copy of the data denominated as the data copy being stored on the second data storage system, a method for managing failover during a copy session, wherein data is being copied from the first data storage system to the second data storage system, the method comprising the computer-executable steps of:
   responsive to a failure occurring during the copy session, stopping data transfer associated with the copy session that experiences the failure;
   during the period when copying is stopped, determining the specific failure mode; and
   re-starting the stopped data transfer and allowing copying to continue in accordance with a recovery mode based on the specific failure mode, wherein if the specific failure mode is a data path failure mode, then finding an alternative path for copying, and re-starting the stopped data transfer and allowing copying to continue along the alternative path and, wherein any data transfer associated with copying occurring along the alternative data path that has not experienced failure is not stopped.

2. The method of claim 1, wherein if the specific failure mode is related to a failure with a processor owning the logical unit to which the data is copied then the copy session is transferred to another processor for management of the failure.

3. The method of claim 1, wherein a user may select predetermined rules in advance of a failure to determine how a failover is implemented in accordance with the specific failure mode discovered.

4. The method of claim 3, wherein if the specific failure mode is a data path failure mode, then finding an alternative path for copying, and re-starting the stopped data transfer and allowing copying to continue along the alternative path.

5. The method of claim 4, wherein any data transfer associated with copying occurring along the alternative data path that has not experienced failure is not stopped.

6. The method of claim 3, wherein if the specific failure mode is related to a failure with a processor owning the logical unit to which the data is copied then the copy session is transferred to another processor for management of the failure.

7. The method of claim 3, wherein if the specific failure mode is related to a failure with a processor owning the logical unit from which the data is copied then the copy session is transferred to another processor for management of the failure.

8. A computer program product including a computer-readable medium encoded with program logic for allowing the following computer-executable steps to occur for managing failover during a copy session when data is being copied from a first data storage system to a second data storage system:
   responsive to a failure occurring during the copy session, stopping data transfer associated with the copy session that experiences the failure;
   during the period when copying is stopped, determining the specific failure mode; and re-starting the stopped data transfer and allowing copying to continue in accordance with a recovery mode based on the specific failure mode; and
   re-starting the stopped data transfer and allowing copying to continue in accordance with a recovery mode based on the specific failure mode, wherein if the specific failure mode is a data path failure mode, then finding an alternative path for copying, and re-starting the stopped data transfer and allowing copying to continue along the alternative path, wherein any data transfer associated with copying occurring along the alternative data path that has not experienced failure is allowed to finish before re-starting the stopped data transfer.

* * * * *